Nov. 24, 1959   R. H. KOCH   2,913,859
METHOD OF MAKING BEARINGS
Filed March 30, 1956

INVENTOR
ROBERT H. KOCH
BY Edward H. Goodrich.
HIS ATTORNEY.

United States Patent Office 2,913,859
Patented Nov. 24, 1959

2,913,859

METHOD OF MAKING BEARINGS

Robert H. Koch, Union, N.J., assignor to General Motors Corporation, Detroit, Mich., a corporation of Delaware Application March 30, 1956, Serial No. 575,064

5 Claims. (Cl. 51—291)

This invention relates to antifriction bearings and particularly to an improved method of making a roller bearing wherein the rolling elements do not tend to slide or become misaligned under rapid changes in speed of bearing operation.

Heretofore, in antifriction bearings arranged to radially support a load, it has been common practice to provide cylindrical inner and outer race rings which are relatively rotatable through an intervening series of cricumferentially arranged rollers that roll against opposed annular raceways in those race rings, the load being usually distributed through less than half of these rolling elements in an upper portion of the bearing. In such a bearing construction the increased pressure of the raceways against the rollers at the load-carrying zone causes a slightly accelerated movement of each roller upon entering the loaded zone. Similarly, each roller decelerates slightly upon leaving the loaded zone. This non-uniform roller movement is usually compensated for by providing a slightly loose fit of the rollers between the raceways outside of the loaded zone so that the rollers may readjust their positions. Also, this loose fit of the rollers between the race rings when outside of the loaded zone allows any misaligned rollers to shift into proper coaxial relation with the bearing upon entering the loaded zone. This arrangement has been generally satisfactory for roller bearings when operating under sbustantially uniform load and at speeds of rotation which are not subjected to rapid changes.

However, when such a bearing is subjected to very sudden changes in acceleration, and particularly under conditions of light load, the rollers do not maintain a proper rolling condition and frequently skid and slide against portions of the raceways. This skidding and sliding of the rollers rapidly wears uneven portions on the rollers and on the raceways and produces bearing inaccuracies as well as objectionable heating and friction, thereby greatly shortening bearing life, which often ends in sudden bearing failure.

It is, therefore, an object of this invention to provide an improved bearing and an improved method for making a bearing wherein the sliding and non-uniform rotational rolling element movements are substantially eliminated under varying conditions of bearing operation.

It is a further object to provide an improved method of making a bearing wherein the rolling elements are caused to move through diametrically opposed loaded zones in the bearing during operation of the bearing.

It is a further object to provide an improved method of making a bearing wherein a race ring is preshaped to a predetermined condition out of round.

To these ends and also to improve generally upon devices and methods of this character, this invention consists in the various matters hereinafter described and claimed. In its broader aspects, the invention is not necessarily limited to the specific arrangement or method selected for illustrative purposes in the accompanying drawings wherein:

Figures 1, 2, 3, 4:
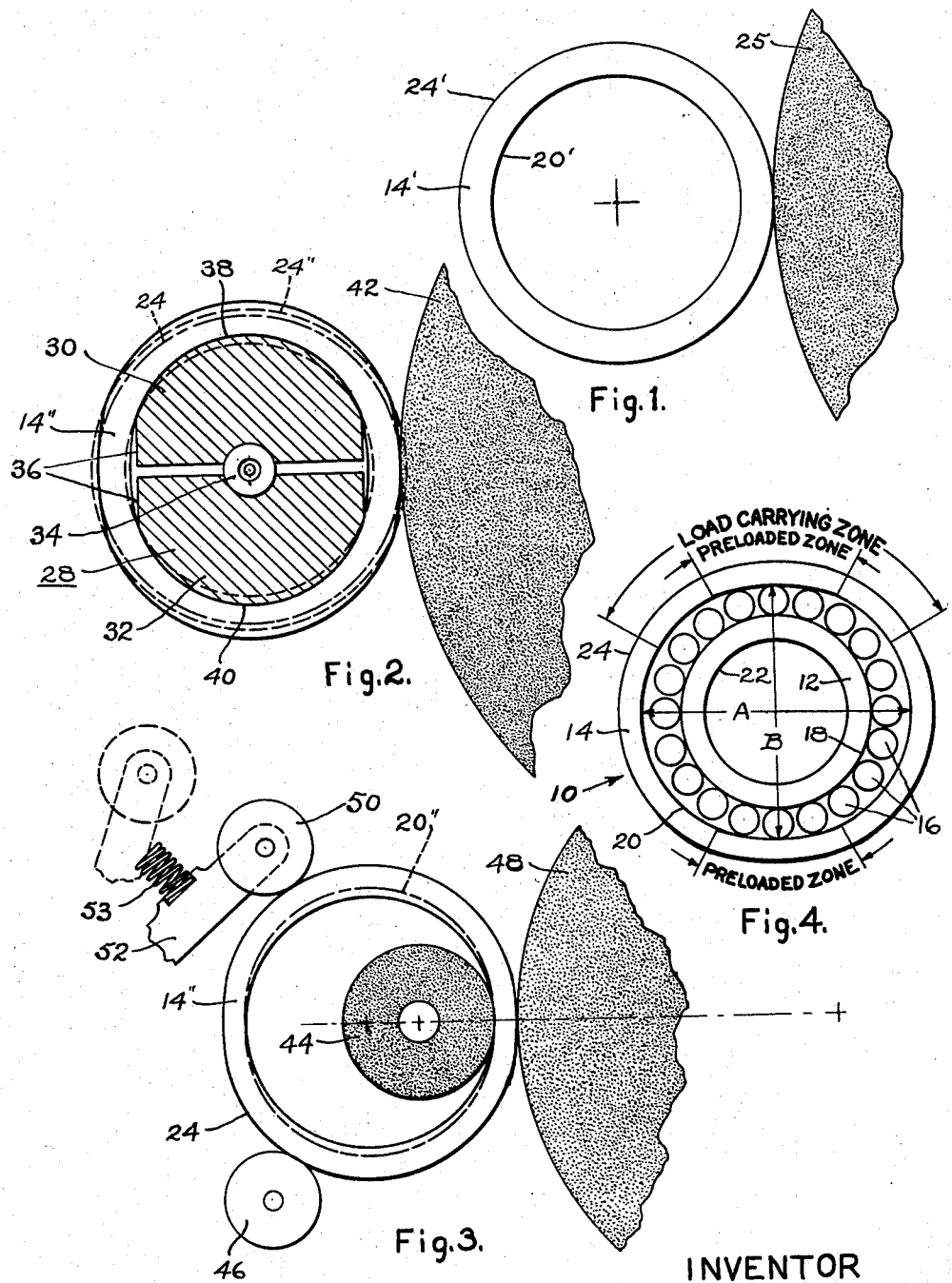
Figure 1 shows the cylindrical grinding of a race ring.
Figure 2 shows the grinding of a race ring blank to a cylindrical outer contour while expanded to an out of round condition.
Figure 3 illustrates the internal grinding of the race ring to an out-of-round contour corresponding to the outer contour of the ring.
Figure 4 shows a roller bearing made in accordance with my preferred method certain parts being exaggerated in shape for better illustration of the invention.

My method provides an antifriction bearing 10 having an inner race ring 12 and an outer race ring 14, these rings being arranged for relative substantially coaxial rotation through a series of circumferentially arranged rollers 16 which roll against inner and outer annular raceways 18 and 20 on the inner and outer race rings. If desired, the rollers 16 may be circumferentially spaced with respect to each other by a suitable cage (not shown). These rollers are illustrated as cylindrical with straight elements matingly engaging the raceways 18 and 20. However, it will be appreciated that other forms of rolling elements may be employed in fitting engagement with the raceways. The inner race ring 12 has its raceway 18 shaped as a surface of revolution herein illustrated as cylindrical and coaxial of a bore 22 through this race ring. The outer race ring is formed slightly oval and has a slightly oval outer raceway 20 provided with a major diameter A and a minor diameter B. For clarity of illustration, the ovality of this outer race ring is greatly exaggerated since the difference in length between the major and minor diameters is usually only a few thousandths of an inch and may even be a much lesser distance. The inner and outer race rings are illustrated as having straight elements to receive cylindrical rollers. However, these elements may be curved dependent upon the longitudinal shape of the rollers. The periphery 24 of the outer race ring may be lightly fitted in a suitable cylindrical housing bore to support the bearing in operating position, this fit preferably being insufficiently tight to change the extent of ovality of the outer race ring.

In previous attempts to produce roller bearings with preloaded zones, it has been contemplated to spring the outer race ring beyond its elastic limit to an oval contour after it has been finish-ground to a predetermined cylindrical size. However, it has been found impractical to control the ovality of such an outer race ring since minor differences in the elastic limits of similar race rings cause these rings to assume set contours having different extents of ovality.

In my improved method, the extent of ovality of this outer race ring is precisely and easily controlled within even a very small fraction of one-thousandth of an inch. To accomplish this, a race ring blank 14' is initially ground as by a grinding wheel 25 to provide a cylindrical ring periphery 24'. The interior of the ring is ground at 20' to a correspondingly cylindrical form thereby providing the cylindrical blank 14' of uniform radial wall thickness. This grinding operation may be performed in any conventional manner as by mounting the blank 14' upon centers or even by supporting and grinding it by the well known centerless grinding method.

The cylindrical blank 14' is thereafter temporarily sprung to a predetermined extent of slight ovality as shown at 14" in Figure 2, this springing action being accomplished as by an expansion chuck 28 having a pair of opposed jaws 30 and 32 adjustably expanded by a wedge member 34. The jaws are cut away at 36 and their rounded work blank engaging faces 38 and 40 are preferably shaped to conform to the desired oval contour to which the interior of the ring 14" is sprung. This springing action of the previously cylindrical ring 14' to the oval form 14" lies within the elastic limit of the ring so that no set is imparted to the ring. The chuck 28 is next mounted on suitable centers and the ring 14″ and chuck 28 are rotated about the axis of these centers during a cylindrical grinding operation performed by a grinding wheel 42 on the external periphery of the sprung ring 14″. This grinding operation reshapes the now slightly oval exterior contour of the ring 14″ to a cylindrical contour indicated at 24″. The ring 14″ is thereafter removed from grinding position and the chuck 28 is removed from the ring allowing the ring to spring back since it was not expanded beyond its elastic limit. The extent of springing of the ring and the subsequent grinding of its periphery is precisely controlled so that the removal of the chuck permits this ring 14″ to now spring back to the precisely predetermined oval periphery 24 required in the outer race ring 14 of the final assembled bearing. The ring 14″ is thereafter subjected to an internal grinding operation by a grinding wheel 44 while this ring is externally centerless supported as by a roller 46 on a fixed axis and by a regulating wheel 48 having its axis lying in a straight line passing substantially through the axis of the work piece 14″ and passing through the axis of the grinding wheel 44 as shown in Figure 3. A roller 50 on a suitable spring pressed arm 52 is urged into position by a spring 53 engaging the exterior surface 24 of the ring 14″ to maintain it in engagement with the periphery of the roller 46 and against the periphery of the regulating or driving wheel 48. This regulating wheel does not perform a grinding operation upon the periphery of the ring but simply serves to rotatably drive it during an internal grinding operation performed by the grinding wheel 44. The arm 52 and roller 50 are arranged to be swung to the dash-indicated position for positioning and removal of the ring 14″.

The original cylindrical internal wall 20′ of the ring 14′ was resiliently sprung to a condition of ovality during the external grinding of the blank 14″ and thereafter returned to a cylindrical condition when the expansion chuck stresses were relieved. Since the external wall 24 of the work blank as shown in Figure 3 is now of the precisely predetermined oval form, this oval contour due to its centerless support will cause the ring 14″ during its rotation to so move that the grinding wheel 44 will grind a correspondingly oval internal contour 20″ on the ring 14″ thereby producing the precisely required ovality of the raceway 20 having the prescribed major and minor diameters A and B. This arrangement of grinding provides a uniform wall section throughout the entire outer race ring 14. It should be understood that the diagrammatic showings in Figures 2, 3 and 4 have been greatly exaggerated to clearly indicate this extent of ovality since in many instances the difference between the major and minor diameters A and B is very slight and of the order of only a few thousandths of an inch or even as little as a fraction of a thousandth of an inch.

When the bearing is thereafter assembled as shown in Figure 4, the outer race ring 14 will have the precisely required oval contour with the major and minor diameters A and B to provide diametrically opposed preloaded zones as indicated. The radial spacing between the raceways 18 and 20 along the minor diameter B is preferably slightly less than the diameter of one of the rollers 16 and the raceway spacing along the major diameter A is preferably only slightly in excess of this roller diameter. Hence, when the rollers enter and pass through the short arcuate bearing zones through which the minor diameter centrally extends, these rollers will be under a radial load in a preloaded zone as indicated in Figure 4. With this arrangement, the rollers upon entering the very slightly narrow throat of the upper preloaded zone of the bearing will gradually increase their raceway engaging contact and slightly accelerate in their gyratory movements as they approach the minor axis B. This condition also exists with respect to the rollers approaching the lower preloaded zone and assures a positive rolling movement of the rollers as well as assuring axial alignment of these rollers in parallel relation to the bearing axis thus eliminating the very objectionable tendency of roller scuffing and roller misalignment as has been common in prior types of cylindrical roller bearings. Additionally, this arrangement of passing these rollers through diametrically opposed preloaded zones is particularly effective in maintaining proper operation in a roller bearing which is subjected to sudden changes in rotational speed under conditions of light load.

In the illustration of Figure 4, one of the preloaded zones is shown centrally disposed within the load-carrying zone of the bearing. However, my invention is not intended to be limited to this particular relation of these zones since it has been found desirable in some instances to mount the outer race ring with a sufficiently light fit in a housing or the like so that this race ring may occasionally turn slightly at the start of bearing operation. My invention provides for proper roller operation irrespective of the positions of the preloaded zone with respect to the load-carrying zone.

I claim:

1. The method of making an antifriction bearing having a plurality of rolling elements between a pair of relatively rotatable race rings, including the steps of making both race rings circular, temporarily diametrically expanding one of the race rings within its elastic limit to a predetermined oval contour, shaping the periphery of the temporarily expanded ring to a circular surface of predetermined size, returning the ring to its non-expanded form and shaping the internal surface of said ring to a corresponding oval contour of predetermined size and having the same radial wall thickness throughout its annular extent.

2. The method of making a race ring for a bearing having a plurality of rolling elements between a pair of relatively rotatable race rings, including the steps of forming on one of the race rings a coaxial circular periphery and a circular raceway, temporarily and diametrically stretching said ring within its elastic limit to a predetermined oval shape and size, grinding the oval contour of the ring to a predetermined circular form while the ring is held in its stretched form, returning the ring to its unstretched form to provide an oval periphery of predetermined size and shape, and grinding the raceway of said oval shaped ring to an oval contour of predetermined size and shape under control of the finished oval periphery of said ring, said grinding operation shaping the race ring to the same radial thickness throughout its periphery.

3. The method of making a race ring for a bearing having a plurality of rolling elements between a pair of relatively rotatable race rings, comprising the steps of forming on one of the race rings a cylindrical internal periphery and a coaxial cylindrical raceway, temporarily stretching said ring diametrically and within its elastic limit to a predetermined extent of ovality, grinding the oval external contour of the ring periphery to a cylindrical shape of predetermined size while the ring is held in its temporarily stretched condition, relieving the temporarily stretched condition of the ring to provide an oval ring periphery of predetermined size, and grinding the raceway of said ring under control of its external oval contour and providing a ring of uniform wall thickness having an oval raceway of predetermined size with its major and minor diameters located along the major and minor diameters of the oval ring periphery.

4. The method of making a race ring for a bearing having a plurality of rolling elements between a pair of relatively rotatable race rings, comprising the steps of forming on one of the rings a circular periphery and a concentric circular raceway therein coaxial with said periphery, applying an expansion chuck against the raceway and temporarily diametrically expanding said ring throughout its axial length and within its elastic limit to a predetermined ovality and size, grinding the oval periphery of the ring to a surface of revolution coaxial with the axis of the chuck, removing the chuck from the ring and relieving the temporary ring expansion causing its periphery to assume an oval contour of predetermined size, and grinding said raceway to a uniform radial thickness and to an oval contour of predetermined size under control of the finished oval contour of said ring periphery.

5. The method of making a race ring for a bearing having a plurality of rolling elements between a pair of relatively rotatable race rings, comprising the steps of forming a circular race ring having a circular internal raceway coaxial with a circular external periphery, diametrically expanding the ring within its elastic limit to temporarily provide an oval race ring periphery of predetermined shape and size, grinding the oval race ring periphery to a surface of revolution of predetermined size while it is temporarily expanded, returning the ring to its non-expanded form to provide an oval periphery having major and minor diameters of predetermined lengths, rotatably and externally supporting the oval contour of the race ring at spaced points by a plurality of members one of which rotates the race ring, and internally grinding said raceway under control of said rotatable support to a predetermined oval size having major and minor diameters lying along the major and minor diameters of said oval periphery, and said grinding operation providing a uniform radial ring thickness throughout its periphery.

References Cited in the file of this patent

UNITED STATES PATENTS

| | | |
|---|---|---|
| 1,818,085 | Nelson | Aug. 11, 1931 |
| 1,834,772 | Mullen | Dec. 1, 1931 |
| 2,004,649 | Booth | June 11, 1935 |
| 2,559,621 | Hill | July 10, 1951 |